(12) United States Patent
Shono et al.

(10) Patent No.: US 6,282,470 B1
(45) Date of Patent: Aug. 28, 2001

(54) VEHICLE HEIGHT ADJUST CONTROL APPARATUS AND METHOD

(75) Inventors: Shoichi Shono, Nishikamo-gun; Atushi Sato, Susono; Masaaki Tabata, Chiryu, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/166,078

(22) Filed: Oct. 5, 1998

(30) Foreign Application Priority Data

Jan. 12, 1998 (JP) .................................................. 10-004281

(51) Int. Cl.[7] .................................................. B60G 21/06
(52) U.S. Cl. ................................ 701/37; 701/48; 180/41; 280/5.5; 280/5.514; 280/6.157
(58) Field of Search .......................... 701/37, 48; 180/41; 307/116, 118; 280/5.5, 5.514, 6.157, 124.159

(56) References Cited

U.S. PATENT DOCUMENTS 5,083,275 * 1/1992 Kawagoe et al. ...................... 701/37

FOREIGN PATENT DOCUMENTS 2-246812  10/1990  (JP) .

* cited by examiner

Primary Examiner—William A. Cuchlinski, Jr.
Assistant Examiner—Yonel Beaulieu
(74) Attorney, Agent, or Firm—Oliff & Berridge, PLC

(57) ABSTRACT

A vehicle height adjust control apparatus that increases the durability or service life of a fluid system, including a fluid supply-discharge device and a fluid actuator, can have a pressure sensor and vehicle height sensors. If a microcomputer determines that the pressure detected by the pressure sensor is greater than a predetermined pressure, the microcomputer changes a target vehicle height to a vehicle height presently detected by the vehicle height sensors. In a preferred construction, the target vehicle height is changed to the vehicle height presently detected, if it is determined that the detected pressure remains greater than the predetermined pressure for at least a predetermined length of time. The predetermined length of time is changed to a longer time when the fluid temperature is relatively low. These additional determination conditions prevent unnecessary or ineffective changes of the target vehicle height due to by a sensor abnormality or a fluid temperature change.

20 Claims, 9 Drawing Sheets

VEHICLE HEIGHT ADJUST CONTROL APPARATUS AND METHOD

INCORPORATION BY REFERENCE

The disclosure of Japanese Patent Application No. HEI 10-4281 filed on Jan. 12, 1998 including the specification, drawings and abstract is incorporated herein by reference in its entirety.

BACKGROUND OF THE INVENTION

1. Field of Invention

The present invention relates to a vehicle height adjust control apparatus and method for automatically adjusting a vehicle height to a predetermined target vehicle height.

2. Description of Related Art

A vehicle height adjust control apparatus described in Japanese Patent Application Laid-Open No. Hei 2-246812, for example, includes an actuator provided between a vehicle body and wheels, the actuator being capable of changing a vehicle height by fluid supplied and discharged, a supply-discharge device for supplying fluid into and discharging it from the actuator, and a vehicle height detection device for detecting a vehicle height. The supplying of fluid to and the discharging of it from the actuator performed by the fluid supply-discharge device is controlled on the basis of the detected vehicle height so that the vehicle height detected becomes equal to a target vehicle height.

In this related technology, however, if the vehicle height cannot be increased to a target vehicle height despite a considerably high fluid pressure in the fluid supply-discharge device and the actuator, due to an excessively large superimposed load, the ability of the fluid supply-discharge device and the actuator, an abnormality in the vehicle height detection by the vehicle height detection device, and the like, the fluid pressure in the fluid supply-discharge device and the actuator is further increased, or the fluid supply-discharge device and the actuator continue operating for vehicle height adjustment. Such operating conditions are unfavorable in terms of the durability or service life of the fluid supply-discharge device and the actuator. Furthermore, if the target vehicle height is reached, the pressure in the actuators and the fluid supply-discharge device becomes abnormally high, which is also unfavorable in terms of the durability or service life of the fluid supply-discharge device and the actuator. The aforementioned undesirable conditions are remarkable when the fluid temperature is low, particularly in a case where the fluid is a hydraulic oil whose viscosity greatly varies depending on temperature.

SUMMARY OF THE INVENTION

Accordingly, it is an object of the present invention to provide a vehicle height adjust control apparatus and method that increases the durability or service life of a fluid system that includes a fluid supply-discharge device and a fluid actuator.

According to one aspect of the invention, there is provided a vehicle height adjust control apparatus including an actuator capable of changing a height of a vehicle, a fluid supply-discharger that supplies fluid to the actuator and discharges the fluid from the actuator, a vehicle height detector that detects a vehicle height, a vehicle height adjustment controller that controls supply of the fluid to and discharge of the fluid from the actuator by the fluid supply-discharger, on the basis of the vehicle height detected by the vehicle height detector, so that the vehicle height detected by the vehicle height detector becomes substantially equal to a predetermined target vehicle height, and a pressure detector for detecting a pressure of the fluid supplied to the actuator. If it is determined that the pressure detected by the pressure detector is greater than a predetermined pressure, the target vehicle height is changed to a changed target vehicle height equal to the vehicle height detected by the vehicle height detector. The actuator may be provided between a vehicle body and each wheel.

If the vehicle height cannot be increased to the target vehicle height despite a considerably high fluid pressure in the fluid supply-discharger and the actuator, because of an excessively large load superimposed on the vehicle, the ability of the fluid supply-discharger and the actuator, an abnormality in detection of the vehicle height by the vehicle height detector, or other reasons, the target vehicle height is changed to the vehicle height detected by the vehicle height detector, on condition that the pressure detected by the pressure detector is greater than the predetermined pressure. Therefore, it becomes possible for the vehicle height adjustment controller to adjust the vehicle height substantially to the target vehicle height by controlling the supply of the fluid to and the discharge thereof from the actuator by the fluid supply-discharger. In this manner, the vehicle height adjust control apparatus prevents a situation where the fluid pressure in the fluid supply-discharger and the actuator becomes very high and a situation where the fluid supply-discharger and the actuator continue operating for a long time. Consequently, the durability or service life of the fluid supply-discharger and the actuator are increased.

As for the condition for changing the target vehicle height, it may be determined that the pressure detected by the pressure detector is greater than the predetermined pressure if the pressure detected by the pressure detector remains greater than the predetermined pressure for at least a predetermined length of time. Therefore, it becomes possible to prevent a change of the target vehicle height due to a false pressure detection, for example, wherein the detected pressure is instantaneously increased to a very high level by contamination of a pressure detection signal with noise of the like.

The vehicle height adjust control apparatus may further include a temperature detector that detects a temperature of the fluid supplied to the actuator, wherein the predetermined length of time is longer when the temperature of the fluid detected by the temperature detector is relatively low than when the temperature of the fluid detected by the temperature detector is relatively high. Therefore, if the temperature of the fluid, in particular, hydraulic fluid, is low so that the pressure of the fluid supplied to the actuator becomes higher in comparison with a case where the fluid temperature is high, the target vehicle height is not changed until the detected pressure continues to be above the predetermined pressure for a time that is longer than the time used when the fluid temperature is high. Consequently, the vehicle height adjust control apparatus prevents ineffective or unnecessarily frequent changes of the target vehicle height even when the fluid temperature is low.

According to another aspect of the invention, there is provided a vehicle height adjust control apparatus including an actuator capable of changing a height of a vehicle, a fluid supply-discharger that supplies fluid to the actuator and discharges the fluid from the actuator, a vehicle height detector that detects a vehicle height, a vehicle height adjustment controller that controls supply of the fluid to and discharge of the fluid from the actuator by the fluid supply-discharger, on the basis of the vehicle height detected by the vehicle height detector, so that the vehicle height detected by the vehicle height detector becomes substantially equal to a predetermined target vehicle height, a pressure detector that detects a pressure of the fluid supplied to the actuator, and a suspension controller that, if it is determined that the pressure detected by the pressure detector is greater than a predetermined pressure, suspending the supply of the fluid to the actuator for a predetermined length of time and then allowing the supply of the fluid to the actuator. If it is determined that the pressure detected by the pressure detector is greater than the predetermined pressure while the supply of the fluid to the actuator is allowed after suspension of the supply of the fluid by the suspension controller, the target vehicle height is changed to a changed target vehicle height equal to the vehicle height detected by the vehicle height detector.

In this vehicle height adjust control apparatus, the first time the pressure detected by the pressure detector exceeds the predetermined pressure, the supply of the fluid to the actuator is suspended for the predetermined length of time by the suspension controller. The target vehicle height is not changed to the vehicle height detected by the vehicle height detector, until the next time the pressure detected by the pressure detector exceeds the predetermined pressure while the supply of the fluid to the actuator is allowed after the suspension. That is, if the vehicle height detected by the vehicle height detector cannot be increased to the target vehicle height due to a low fluid temperature in a period immediately after the start of the engine, it may become possible to increase the vehicle height to the target vehicle height by an vehicle height adjusting operation after the suspension. Therefore, the vehicle height adjust control apparatus prevents unnecessary or ineffective changes of the target vehicle height.

As for the condition for suspending the supply of the fluid to the actuator and for changing the target vehicle height, it may be determined that the pressure detected by the pressure detector is greater than the predetermined pressure if the pressure detected by the pressure detector remains greater than the predetermined pressure for at least a predetermined length of time. Therefore, it becomes possible to prevent unnecessarily frequent suspensions of the supply of the fluid to the actuator and unnecessarily frequent changes of the target vehicle height due to a false pressure detection, for example, wherein the detected pressure is instantaneously increased to a very high level by contamination of a pressure detection signal with noise or the like.

The vehicle height adjust control apparatus may further include a target vehicle height changing switch that changes the target vehicle height, wherein if an operation of the target vehicle height changing switch is detected, the target vehicle height is set to a value corresponding to the operation of the target vehicle height changing switch, regardless of the aforementioned change of the target vehicle height based on a pressure level. Therefore, by operating the target vehicle height changing switch, the target vehicle height can be set to a value corresponding to the operation of the target vehicle height changing switch so that the actual vehicle height will reflect an intention of an occupant, even after the target vehicle height has been changed on the basis of a pressure level as described above.

The vehicle height adjust control apparatus may further include a temperature detector that detects a temperature of the fluid supplied to the actuator, wherein if it is determined that the temperature detected by the temperature detector has changed from below a first predetermined temperature to above a second predetermined temperature that is higher than the first predetermined temperature, the changed target vehicle height is returned to the predetermined vehicle height. Therefore, if the actual vehicle height cannot be adjusted to the target vehicle height because of a low fluid temperature at the time of, for example, the starting of the engine, the target vehicle height is changed at the time of starting of the engine so as to avoid imposing excessive loads on the fluid supply-discharger and the actuator. Subsequently, when the fluid temperature has increased sufficiently, it becomes possible to adjust the actual vehicle height to the target vehicle height intended by an occupant.

The vehicle height adjust control apparatus may further include a door open-closed detector that detects an open state and a closed state of doors (including a trunk lid), wherein if the door-open state is detected by the door open-closed detector and it is determined that the vehicle height detected by the vehicle height detector is greater than the changed target vehicle height, the target vehicle height is changed to the vehicle height detected by the vehicle height detector. The door open-closed detector may be replaced by a stop detector for detecting a stopped state of the vehicle, wherein if the stopped state of the vehicle is detected by the stop detector and it is determined that the vehicle height detected by the vehicle height detector is greater than the changed target vehicle height, the changed target vehicle height is returned to the predetermined target vehicle height. Therefore, if the target vehicle height has been changed because of an excessive load superimposed on the vehicle, the target vehicle height will be returned to the previous value when the superimposed load is reduced, that is, when an occupant gets out of the vehicle or a baggage piece is removed after a door (or the trunk lid) is opened during a stop, so that the vehicle height increasing control becomes possible. Consequently, excessive loads on the fluid supply-discharger and the actuator due to an excessive load superimposed on the vehicle can be avoided and, when the superimposed load is reduced, the actual vehicle height can be adjusted to the target vehicle height intended by an occupant.

As for the conditions for returning the changed target vehicle height to the previous target vehicle height before the change in relation to the door open state or the vehicle stop state and the vehicle height, it may be determined that the vehicle height detected by the vehicle height detector is greater than the changed target vehicle height, if the vehicle height detected by the vehicle height detector remains greater than the changed target vehicle height for at least a predetermined length of time. Therefore, even if there is an instantaneous false detection of the vehicle height, the door state or the vehicle state, due to noise contamination or the like, immediate return of the changed target vehicle height to the previous target vehicle height does not occur. Consequently, this construction prevents unnecessary return of the target vehicle height and therefore prevents unnecessary operation of the fluid supply-discharger and the actuator.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
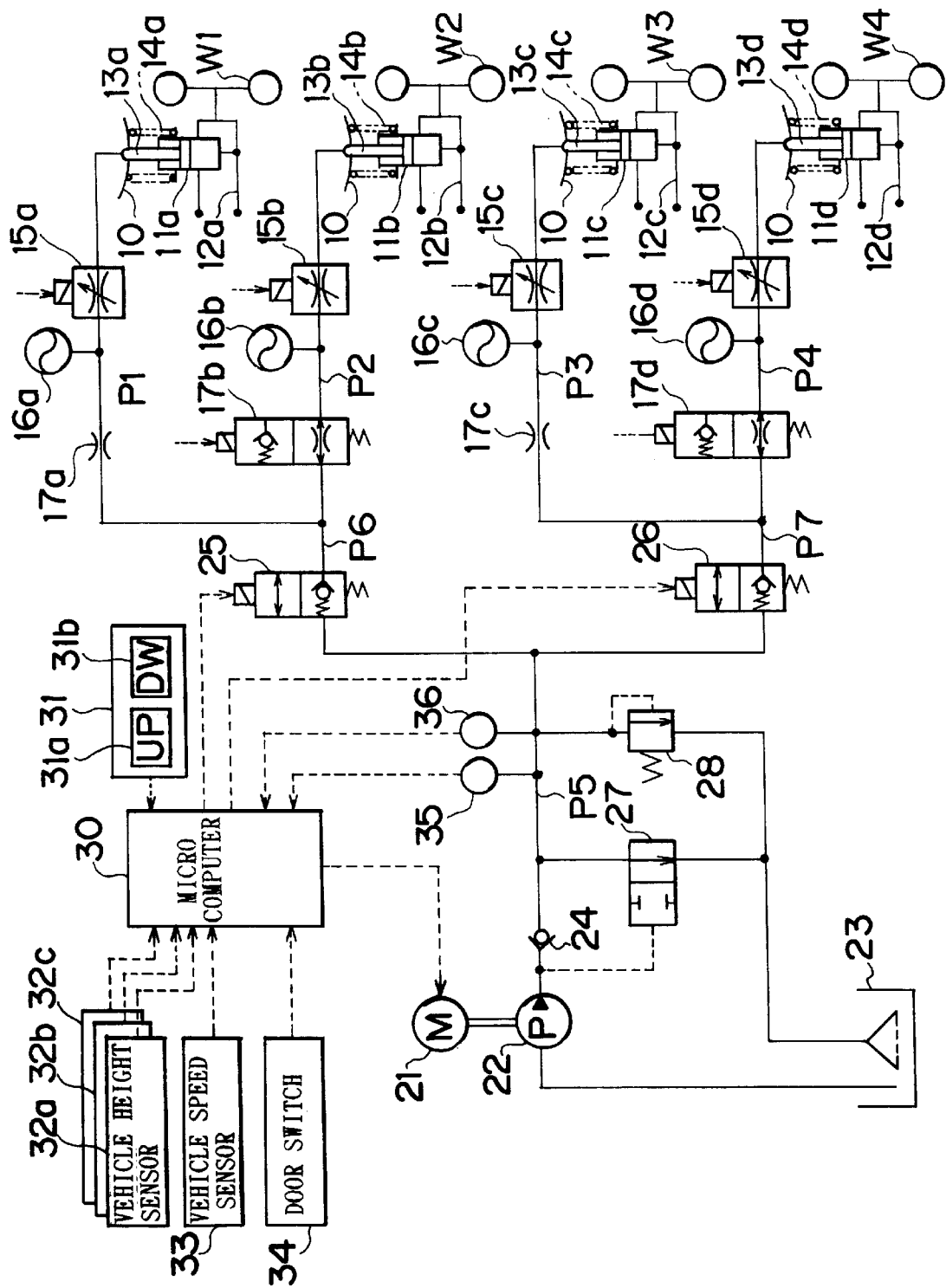
FIG. 1 is a schematic diagram of the overall construction of a preferred embodiment of the vehicle height adjust control apparatus of the invention.

A preferred embodiment of the present invention will be described in detail hereinafter with reference to the accompanying drawings. FIG. 1 is a schematic illustration of a vehicle height adjust control apparatus according to the embodiment of the invention.

The vehicle height adjust control apparatus has hydraulic cylinders 11a–11d that form hydraulic actuators for setting vehicle heights, near left and right front wheels W1, W2 and left and right rear wheels W3, W4, respectively. Each of the hydraulic cylinders 11a–11d is connected at its lower end to a lower arm 12a–12d connecting to the corresponding one of the wheels W1–W4. A piston rod 13a–13d of each hydraulic cylinder 11a–11d protrudes from an upper surface thereof. Upper end portions of the piston rods 13a–13d are fixed to a vehicle body 10. Hydraulic fluid is supplied to and discharged from the hydraulic cylinders 11a–11d through fluid passages P1–P4, respectively. In accordance with supply and discharge of hydraulic fluid, the hydraulic cylinders 11a–11d change the vehicle heights at the respective wheel positions.

Coil springs 14a–14d are disposed between the vehicle body 10 and the hydraulic cylinders 11a–11d, respectively. The fluid passages P1–P4 are provided with variable orifices 15a–15d, respectively. Accumulators 16a–16d are connected to the fluid passages P1–P4, respectively. In cooperation with the coil springs 14a–14d, the variable orifices 15a–15d and the accumulators 16a–16d, the hydraulic cylinders 11a–11d elastically support the vehicle body 10 relative to the wheels W1–W4, and also function as shock absorbers for damping oscillations of the vehicle body 10. The variable orifices 15a–15d are electrically controlled so as to vary their orifice openings. The control of the orifice openings of the variable orifices 15a–15d is not directly related to the invention, and will not be described.

The fluid passages P1, P2 and the fluid passages P3, P4 are connected, at their ends opposite from the hydraulic cylinders 11a, 11b and 11c, 11d, to common fluid passages, respectively. Therefore, hydraulic fluid is collectively supplied to and discharged from the hydraulic cylinders 11a, 11b through the fluid passages P1, P2, and hydraulic fluid is collectively supplied to and discharged from the hydraulic cylinders 11c, 11d through the fluid passages P3, P4. The fluid passages P2, P4 are provided with gate valves 17b, 17d formed by electromagnetic changeover valves, respectively. The gate valves 17b, 17d are in a conveying state as indicated in FIG. 1 when not energized, and they are switched to a non-conveying state when energized. The gate valves 17b, 17d are energized when the vehicle body 10 rolls, for example, at the time of cornering or turning, so as to prevent communication between the hydraulic cylinders 11a and 11b and communication between the hydraulic cylinders 11c and 11d, respectively. The operation of the gate valves 17b, 17d is not directly relevant to the invention, and the description below will be made on assumption that the gate valves 17b, 17d are always in the conveying state as indicated in FIG. 1. The fluid passages P1, P3 are provided with invariable orifices 17a, 17c, respectively, for providing the fluid passages P1, P3 with a passage resistance equivalent to that provided by orifice openings that are formed by the gate valves 17b, 17d when in the conveying state.

A hydraulic pressure supply-discharge device has a hydraulic pump 22 that is driven by an electric motor 21. The hydraulic pump 22 draws hydraulic fluid from a reservoir tank 23, and ejects it into a fluid passage P5 through a check valve 24. The fluid passage P5 divides into fluid passages P6, P7. The branch fluid passage P6 is connected to the connecting point of the fluid passages P1, P2. The branch fluid passage P7 is connected to the connecting point of the fluid passages P3, P4. The fluid passages P6, P7 are provided with leveling valves 25, 26 that are formed by electromagnetic changeover valves, respectively. The leveling valves 25, 26 remain in a non-conveying state as indicated in FIG. 1 when not energized, and they are switched to a conveying state when energized. If the hydraulic pressure in the fluid passages P1–P4 becomes abnormally high, the leveling valves 25, 26 allow discharge of hydraulic fluid from the fluid passages P1–P4 into the fluid passage PS for protection of the apparatus even while they are in the non-conveying state.

A discharge valve 27 and a relief valve 28 are disposed between the fluid passage P5 and the reservoir tank 23. The discharge valve 27 is normally kept in a conveying state, and mechanically switched to a non-conveying state when the ejecting pressure of the hydraulic pump 22 increases. The passage area of the discharge valve 27 when the discharge valve 27 is kept in the conveying state is at least twice as large as the passage area of the leveling valves 25, 26 when they are in the conveying state. The relief valve 28 is normally kept in a non-conveying state. Only when the hydraulic pressure in the fluid passage P5 becomes very high, the relief valve 28 is switched to a conveying state to let hydraulic fluid out of the fluid passage P5 into the reservoir tank 23 for protection of the apparatus.

The electric motor 21 and the leveling valves 25, 26 are associated with a microcomputer 30 that can form an electric control device. The microcomputer 30 executes a main program illustrated in FIG. 2 (including subroutines illustrated in FIGS. 3 through 7) and a drive control program illustrated in FIG. 8 repeatedly every predetermined short length of time, thereby controlling the supply and discharge of hydraulic fluid with respect to the hydraulic cylinders 11a–11d. The microcomputer 30 is associated with a target vehicle height changing switch 31, vehicle height sensors 32a–32c, a vehicle speed sensor 33, a door switch 34, a pressure sensor 35 and a temperature sensor 36.

The target vehicle height changing switch 31 is an element that is operated by an occupant to select vehicle heights. The target vehicle height changing switch 31 includes an up-setting element 31a for increasing the vehicle height from a present level, and a down-setting element 31b for reducing the vehicle height from a present level. In this embodiment, the vehicle height setting can be changed to three levels, that is, low, intermediate and high levels. It is also possible to provide more height levels for vehicle height setting. The vehicle height sensors 32a, 32b are disposed between the vehicle body 10 and the lower arms 12a, 12b at the left and right front wheels W1, W2, respectively. Each of the vehicle height sensors 32a, 32b detects the height of the vehicle body 10 at the left or right front wheel W1, W2 relative to a road surface (or an under-spring member), and outputs a detection signal indicating the actual vehicle height Hf1, Hf2. The vehicle height sensor 32c is disposed at a transversely middle position in a rear portion of the vehicle body 10, between the vehicle body 10 and a frame (corresponding to an under-spring member not shown) connecting the lower arms 12c and 12d. The vehicle height sensor 32c detects the height of the vehicle body 10 at the transversely middle position in the rear portion of the vehicle, relative to the road surface (or the under-spring member), and outputs a detection signal indicating the actual vehicle height Hr.

The vehicle speed sensor 33 detects a vehicle speed V and outputs a detection signal indicating the vehicle speed V. The door switch 34 detects the open and closed states of the doors and the trunk lid of the vehicle, and outputs a door switch signal DS indicating the open or closed state thereof. The door switch signal DS becomes a high level "1" when any one of the doors and the trunk lid of the vehicle is open, and it becomes a low level "0" when all the doors and the trunk lid are closed. The pressure sensor 35 detects a fluid pressure Pm ejected from the hydraulic pump 22, and outputs a detection signal indicating the fluid pressure Pm. The temperature sensor 36 detects a fluid temperature T of hydraulic fluid ejected from the hydraulic pump 22, and outputs a detection signal indicating the fluid temperature T.

The operation of the thus-constructed embodiment will be described. When the ignition switch (not shown) is turned on, the microcomputer 30 executes a program (not illustrated) to initially set "0" in various flags used in programs described below, and then starts to execute the main program illustrated in FIG. 2 and the drive control program illustrated in FIG. 8 repeatedly every predetermined short period.

When the main program is started in step 100, the microcomputer 30 receives inputs of detection signals from the vehicle height sensors 32a–32c, the vehicle speed sensor 33, the hydraulic pressure sensor 35 and the temperature sensor 36 indicating the actual vehicle heights Hf1, Hf2, Hr, the vehicle speed V, the fluid pressure Pm and the fluid temperature T, and also receives an input of the door switch signal DS from the door switch 34 in step 102. If the actual vehicle heights Hf1, Hf2, Hr, the vehicle speed V, the fluid pressure Pm and the fluid temperature T from the sensors 32a–32c, 33, 35, 36 have instantaneous changes and therefore are not suitable for direct use in the operations by the microcomputer 30, the signals of the actual vehicle heights Hf1, Hf2, Hr, the vehicle speed V, the fluid pressure Pm and the fluid temperature T are subjected to low-pass filter processing. After executing step 102, the microcomputer 30 calculates an actual vehicle height Hf(=(Hf1+Hf2)/2) of a front portion of the vehicle body 10 by averaging the actual vehicle heights Hf1, Hf2 in step 104. Subsequently, the microcomputer 30 executes a start determining routine of step 106, a vehicle height changing routine of step 108, a front-wheel target vehicle height changing routine of step 110, a rear-wheel target vehicle height changing routine in step 112, and then a target vehicle height returning routine in step 114. After that, the microcomputer 30 ends the execution of the main program in step 116.

Figure 3:
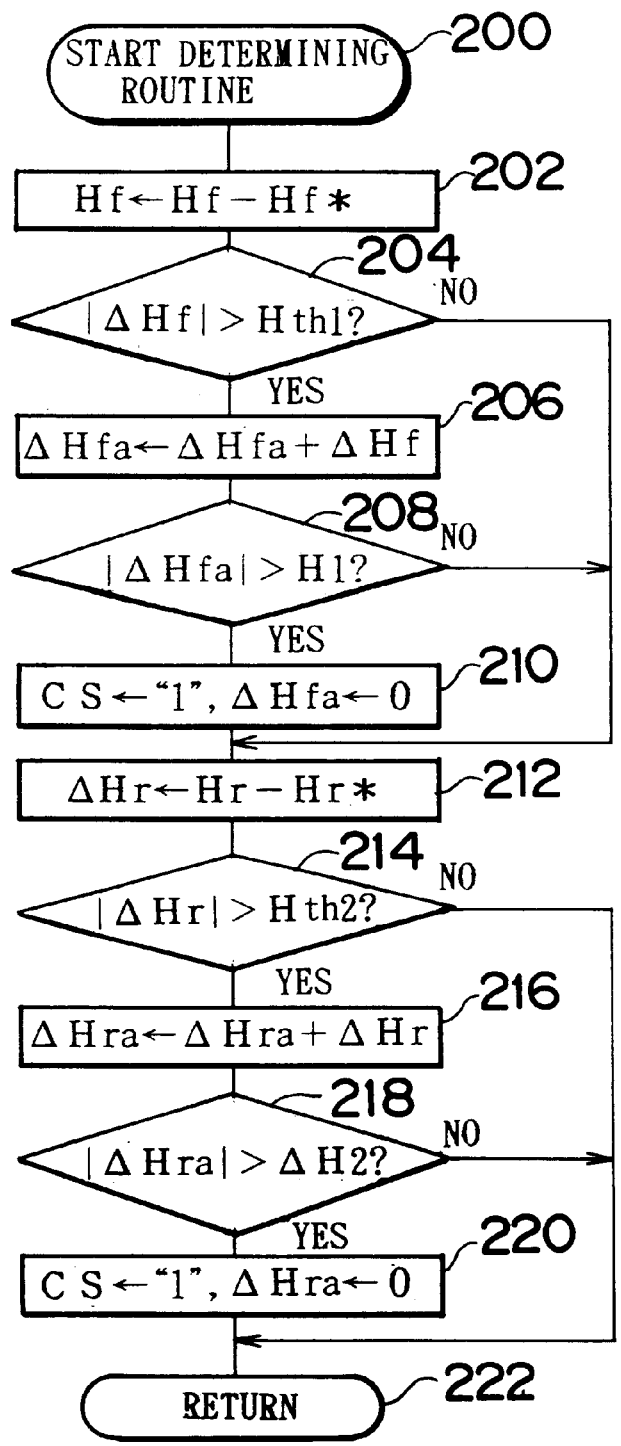
FIG. 3 is a flowchart illustrating in detail the start determining routine indicated in FIG. 2.

The start determining routine is illustrated in detail in FIG. 3. When the start determining routine is started in step 200, the microcomputer 30 calculates a vehicle height deviation $\Delta Hf$ (=Hf−Hf*) by subtracting the target vehicle height Hf* of the front portion of the vehicle body 10 from the actual vehicle height Hf of the front portion thereof detected in step 104. The target vehicle height Hf* is changed in accordance with an operation of the target vehicle height changing switch 31, by processing described below. Before the target vehicle height changing switch 31 is operated, the target vehicle height Hf* indicates a value that was previously set and has been stored in a non-volatile memory in the microcomputer 30. Subsequently in step 204, the microcomputer 30 determines whether the absolute value $|\Delta Hf|$ of the vehicle height deviation $\Delta Hf$ is greater than a positive threshold Hth1 determined beforehand. If the absolute value $|\Delta Hf|$ is equal to or less than the threshold Hth1, the microcomputer 30 makes a negative determination (NO) in step 204, and proceeds to step 212.

In step 212, the microcomputer 30 calculates a vehicle height deviation $\Delta Hr(=Hr-Hr^*)$ by subtracting the target vehicle height Hr* of the rear portion of the vehicle body 10 from the actual vehicle height Hr of the rear portion thereof. The target vehicle height Hr* can also be changed in substantially the same manner as in the target vehicle height Hf*. Before the target vehicle height changing switch 31 is operated, the target vehicle height Hr* indicates a value that was previously set and has been stored in the non-volatile memory. Subsequently in step 214, it is determined whether the absolute value $|\Delta Hr|$ of the vehicle height deviation $\Delta Hr$ is greater than a positive threshold Hth2 determined beforehand. If the absolute value $|\Delta Hr|$ is equal to or less than the threshold Hth2, the microcomputer 30 makes a negative determination (NO) in step 214, and then ends the execution of the start determining routine in step 222.

Figure 4:
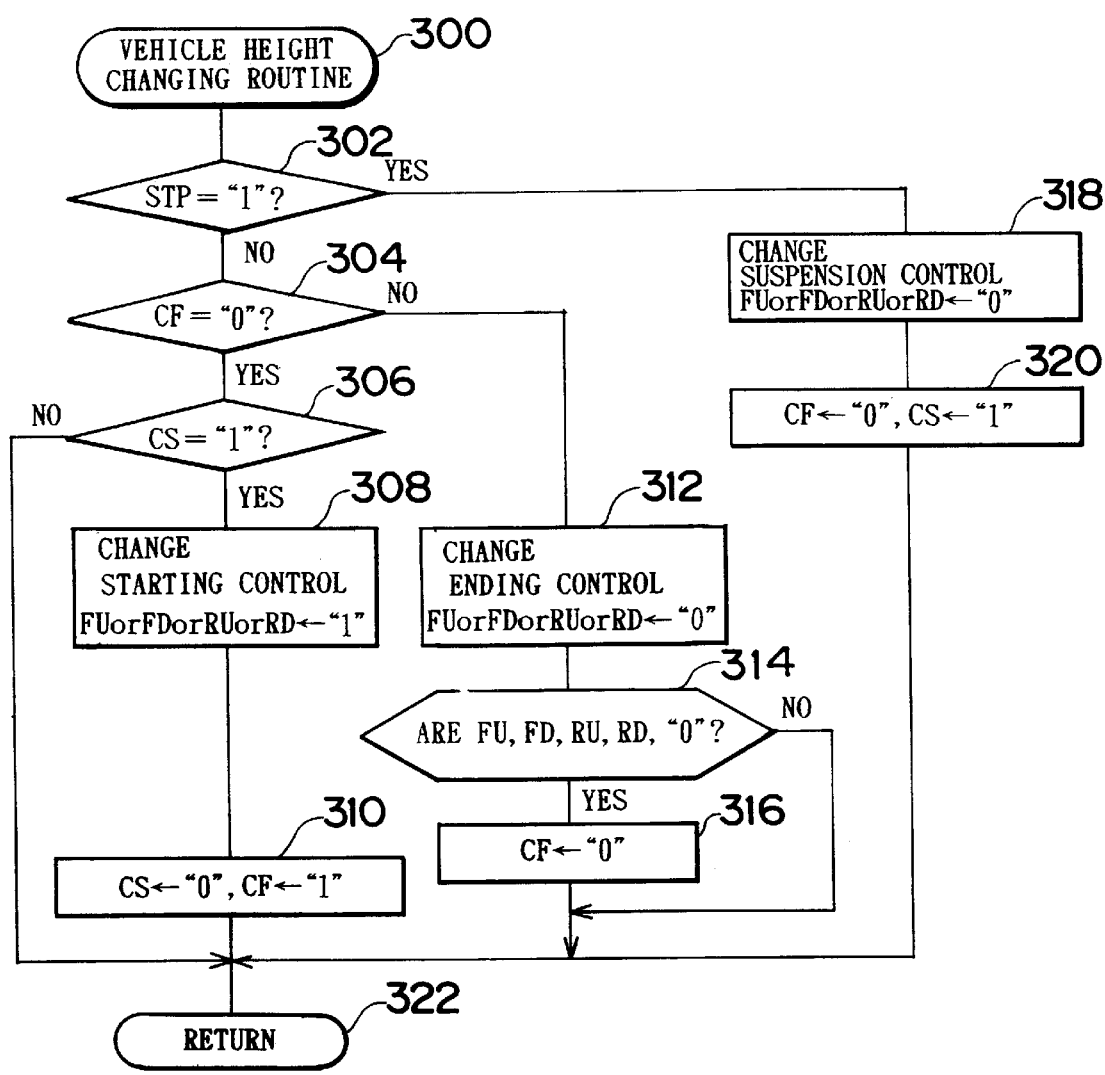
FIG. 4 is a flowchart illustrating in detail the vehicle height changing routine indicated in FIG. 2.

After executing the start determining routine, the microcomputer 30 executes the vehicle height changing routine illustrated in FIG. 4. After starting the routine in step 300, the microcomputer 30 determines in step 302 whether a suspension flag STP is "1". The suspension flag STP indicates by "1" that the vehicle height adjustment control is being suspended. Since the suspension flag STP is initially set to "0", the microcomputer 30 makes a negative determination (NO) in step 302, and proceeds to step 304. In step 304, it is determined whether a changing flag CF is "0". The changing flag CF indicates by "1" that a control operation is being performed for vehicle height adjustment. Since the changing flag CF is initially set to "0", the microcomputer 30 makes an affirmative determination (YES) in step 304, and proceeds to step 306. In step 306, it is determined whether a change start flag CS is "1". The change start flag CS indicates start of vehicle height adjustment by "1". Since the change start flag CS is initially set to "0", the microcomputer 30 makes a negative determination (NO) in step 306, and then ends the execution of the vehicle height changing routine in step 322.

Figure 8:
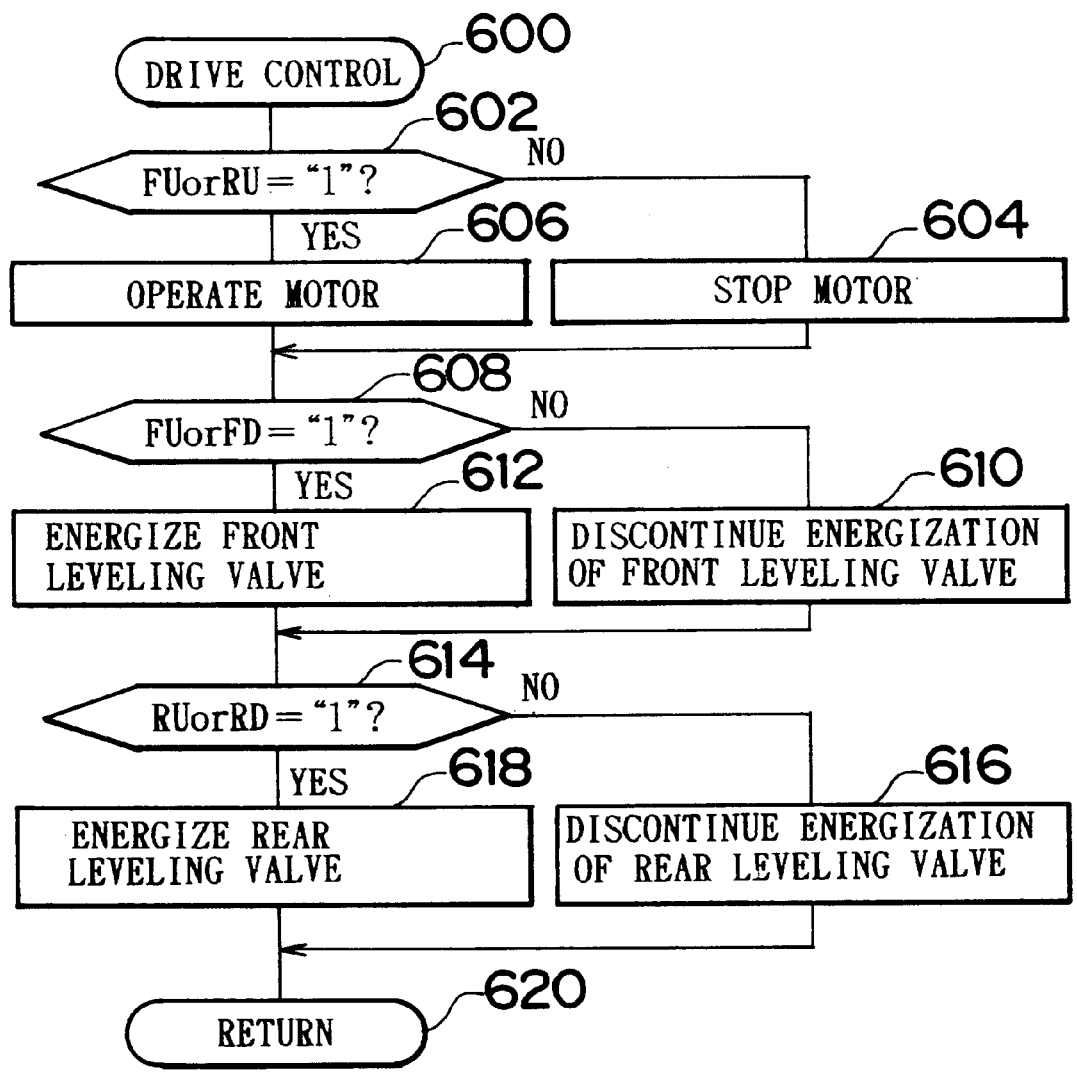
FIG. 8 is a flowchart illustrating a drive control program executed by the microcomputer shown in FIG. 1.

In addition to the execution of the main program, the microcomputer 30 executes the drive control program illustrated in FIG. 8. When the execution of the drive control program is started in step 600, the process of steps 602 through 618 controls the electric motor 21 and the leveling valves 25, 26 corresponding to the set states of a front raising flag FU, a front lowering flag FD, a rear raising flag RU and a rear lowering flag RD. These flags indicate performance of the raising and lowering controls of the front and rear portions of the vehicle body 10, respectively. In this case, since all the flags FU, FD, RU, RD are kept at "0" by the initial setting, the microcomputer 30 stops the electric motor 21 by the process of steps 602, 604, and sets the leveling valve 25 to the non-energized state by the process of steps 608, 610, and sets the leveling valve 26 to the non-energized state by the process of steps 614, 616. As a result, the hydraulic pressure in the hydraulic cylinders 11a, 11b is maintained, and the hydraulic pressure in the hydraulic cylinders 11c, 11d is maintained, so that the vehicle heights of the front and rear portions of the vehicle body 10 are maintained at levels where they have been.

Next described will be an operation performed in a case where the actual vehicle heights Hf, Hr of the front and rear portions of the vehicle body 10 are changed due to a change in the number of occupants, a change in the baggage weight, and the like. If the actual vehicle height Hf of the front portion of the vehicle body 10 increases or decreases so that the absolute value |ΔHf| of the vehicle height deviation ΔHf becomes greater than the threshold Hth1, the microcomputer 30 makes an affirmative determination (YES) in step 204 in the start determining routine in FIG. 3. Subsequently in step 206, the microcomputer 30 calculates an accumulated value ΔHfa of vehicle height deviations ΔHf by performing an arithmetic operation represented by expression (1).

$$\Delta Hfa = \Delta Hfa + \Delta Hf \qquad (1)$$

Until the absolute value |ΔHfa| of the accumulated value ΔHfa becomes greater than a predetermined positive value ΔH1, the microcomputer 30 repeatedly makes a negative determination (NO) in step S208. Because the accumulated value ΔHfa is initially cleared to zero and because step 206 is executed every predetermined time, the accumulated value ΔHfa is substantially equivalent to the integral of the vehicle height deviation ΔHf (the amount of deviation of the actual vehicle height Hf from the target vehicle height Hf*). If the absolute value |ΔHfa| of the accumulated value ΔHfa becomes greater than the predetermined value ΔH1, the microcomputer 30 makes an affirmative determination (YES) in step 208. Then in step 210, the microcomputer 30 sets the change start flag CS to "1", and clears the accumulated value ΔHfa to zero.

If the actual vehicle height Hr of the rear portion of the vehicle body 10 is changed so that the absolute value |ΔHr| of the vehicle height deviation ΔHr of the rear portion becomes greater than the threshold Hth2, the microcomputer 30 makes an affirmative determination (YES) in step 214, and proceeds to step 216. In step 216, the microcomputer 30 calculates an accumulated value ΔHra of vehicle height deviations ΔHr by performing an arithmetic operation represented by expression (2).

$$\Delta Hra = Hra + \Delta Hr \qquad (2)$$

Until the absolute value |ΔHra| of the accumulated value ΔHra becomes greater than a predetermined positive value ΔH2, the microcomputer 30 repeatedly makes a negative determination (NO) in step 218. Because the accumulated value ΔHra is initially cleared to zero and because step 216 is executed every predetermined time, the accumulated value ΔHra is substantially equivalent to the integral of the vehicle height deviation ΔHr (the amount of deviation of the actual vehicle height Hr from the target vehicle height Hr*). If the absolute value |ΔHra| of the accumulated value ΔHra becomes greater than the predetermined value ΔH2, the microcomputer 30 makes an affirmative determination (YES) in step 218. Then in step 220, the microcomputer 30 sets the change start flag CS to "1", and clears the accumulated value ΔHra to zero.

When the change start flag CS has been set to "1" in this manner, the microcomputer 30 makes an affirmative determination (YES) in step 306 in the vehicle height changing routine illustrated in FIG. 4, and then executes a change starting control routine of step 308. In the change starting control routine, one or two of the front raising flag FU, the front lowering flag FD, the rear raising flag RU and the rear lowering flag RD are set to "1". More specifically, if both actual vehicle heights Hf, Hr of the front and rear portions of the vehicle body 10 considerably deviate upward or downward from the target vehicle heights Hf*, Hr*, the front raising flag FU and the rear raising flag RU are set to "1" and the front lowering flag FD and the rear lowering flag RD are maintained at "0"; or alternatively, the front lowering flag FD and the rear lowering flag RD are set to "1" and the front raising flag FU and the rear raising flag RU are maintained at "0". If only one of the actual vehicle heights Hf, Hr deviates upward or downward from the corresponding target vehicle height Hf* or Hr*, the corresponding one of the front raising flag FU, the front lowering flag FD, the rear raising flag RU and the rear lowering flag RD is set to "1", and the other flags are maintained at "0". In this operation, it never happens that one of the front raising flag FU and the rear raising flag RU and one of the front lowering flag FD and the rear lowering flag RD are simultaneously set to "1".

After executing step 308, the microcomputer 30 sets the change start flag CS back to "0" and sets the changing flag CF to "1" in step 310, and ends the execution of the vehicle height changing routine in step 322.

When the drive control program of FIG. 8 is executed in the conditions as described above, the electric motor 21 is driven by the process of steps 602, 606 if both or one of the front raising flag FU and the rear raising flag RU has been set to "1". Therefore, the hydraulic pump 22 draws hydraulic fluid from the reservoir 23 and ejects it into the fluid passage P5. In response to the ejecting fluid pressure, the discharge valve 27 is switched to the non-conveying state. If the front raising flag FU is "1", the leveling valve 25 is energized by the process of steps 608, 612, so that hydraulic fluid, ejected by the hydraulic pump 22, is supplied to the hydraulic cylinders 11a, 11b through the fluid passages P6, P1, P2. Therefore, the hydraulic cylinders 11a, 11b start to raise the positions of the vehicle body 10 relative to the left and right front wheels W1, W2. If the rear raising flag RU is "1", the leveling valve 26 is energized by the process of steps 614, 618, so that hydraulic fluid, ejected by the hydraulic pump 22, is supplied to the hydraulic cylinders 11c, 11d through the fluid passages P7, P3, P4. Therefore, the hydraulic cylinders 11c, 11d start to raise the positions of the vehicle body 10 relative to the left and right rear wheels W3, W4.

Conversely, if both or one of the front lowering flag FD and the rear lowering flag RD has been set to "1", the electric motor 21 is stopped by the process of steps 602, 604 since the front raising flag FU and the rear raising flag RU are maintained at "0". Therefore, the hydraulic pump 22 does not eject hydraulic fluid, so that the discharge valve 27 is maintained in the conveying state. If the front lowering flag FD is "1", the leveling valve 25 is energized by the process of steps 608, 612, so that hydraulic fluid is discharged from the hydraulic cylinders 11a, 11b into the reservoir 23 through the fluid passages P1, P2, P6, P5 and the discharge valve 27. Therefore, the positions of the vehicle body 10 relative to the left and right front wheels W1, W2 start to lower. If the rear lowering flag RD is "1", the leveling valve 26 is energized by the process of steps 614, 618, so that hydraulic fluid is discharged from the hydraulic cylinders 11c, 11d into the reservoir 23 through the fluid passages P3, P4, P7, P5 and the discharge valve 27. Therefore, the positions of the vehicle body 10 relative to the left and right rear wheels W3, W4 start to lower.

When the entire vehicle body 10 or a portion thereof starts to rise or lower through the operation described above, the microcomputer 30 makes a negative determination (NO) in step 304 in FIG. 4, since the changing flag CF has been set to "1" by execution of step 310. Therefore, the microcomputer 30 starts executing a change ending control routine of step 312. In the change ending control routine, the microcomputer 30 compares the target vehicle heights Hf*, Hr* and the actual vehicle heights Hf, Hr of the front and rear portions of vehicle body 10 while the vehicle height is being increased or reduced. When the actual vehicle height Hf becomes substantially equal to the target vehicle height Hf* or when the actual vehicle height Hr becomes substantially equal to the target vehicle height Hr*, the corresponding one of the flags FU, FD, RU and RD, that is, the flag corresponding to the actual vehicle height Hf or Hr that has substantially reached the target vehicle height Hf* or Hr*, is set back to "0". When all the flags FU, FD, RU and RD have been set back to "0", the microcomputer 30 makes an affirmative determination (YES) in step 314, and sets the changing flag CF back to "0" in step 316. In short, if both the front raising flag FU and the rear raising flag RU are set to "1", or if both the front lowering flag FD and the rear lowering flag RD are set to "1", only the flag regarding the portion of the vehicle body 10 where the actual vehicle height Hf or Hr has become substantially equal to the target vehicle height Hf* or Hr* is set back to "0", while the flag regarding the portion where the actual vehicle height Hf or Hr has not become substantially equal to the target vehicle height Hf* or Hr* is maintained at "1". After the actual vehicle heights Hf and Hr of the front and rear portions of the vehicle body BD have become substantially equal to the respective target vehicle heights Hf* and Hr*, the changing flag CF is set back to "0". In this operation, however, if both actual vehicle heights Hf, Hr of the front and rear portions of the vehicle body BD have simultaneously become substantially equal to the respective target vehicle heights Hf*, Hr*, both flags are immediately set back to "0", and the changing flag CF is also set back to "0".

After all of the front raising flag FU, the front lowering flag FD, the rear raising flag RU and the rear lowering flag RD have been set back to "0", the vehicle heights of the vehicle body 10 at the individual wheel positions are maintained at the target vehicle heights by execution of the drive control program of FIG. 8, as in the initial operation described above.

By the operation described above, the vehicle height adjustment is started if the absolute value |ΔHf| of the vehicle height deviation ΔHf of the front portion of the vehicle body 10 continues to be greater than the threshold Hth1 so that the accumulated value ΔHfa exceeds the predetermined value ΔH1, or if the absolute value |ΔHr| of the vehicle height deviation ΔHr of the rear portion of the vehicle body 10 continues to be greater than the threshold Hth2 so that the accumulated value ΔHra exceeds the predetermined value ΔH2. In this manner, the actual vehicle height Hf or Hr of the front or rear portion of the vehicle body 10 is automatically adjusted to the target vehicle height Hf* or Hr*.

Figure 2:
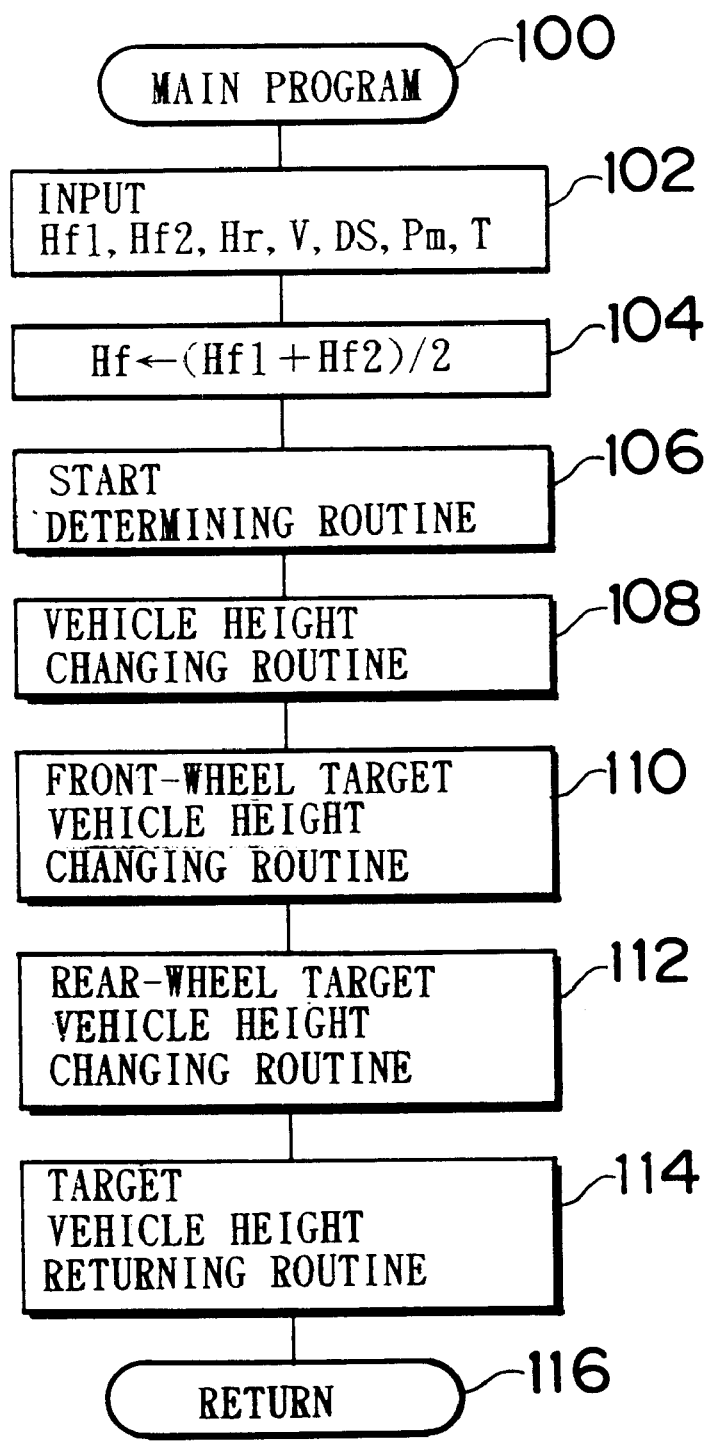
FIG. 2 is a flowchart illustrating a main program executed by the microcomputer shown in FIG. 1.

Next described will be front-wheel target vehicle height changing routine and the rear-wheel target vehicle height changing routine of steps 110, 112 in the main program of FIG. 2. These routines change the target vehicle heights Hf*, Hr*, respectively, if the actual vehicle height Hf or Hr of the front or rear portion of the vehicle body 10 cannot be increased to the target vehicle height Hf* or Hr* because of an excessive load imposed on the vehicle, a failure in the hydraulic system that includes the hydraulic pump 22, a low temperature of the hydraulic fluid, and the like.

Figure 5:
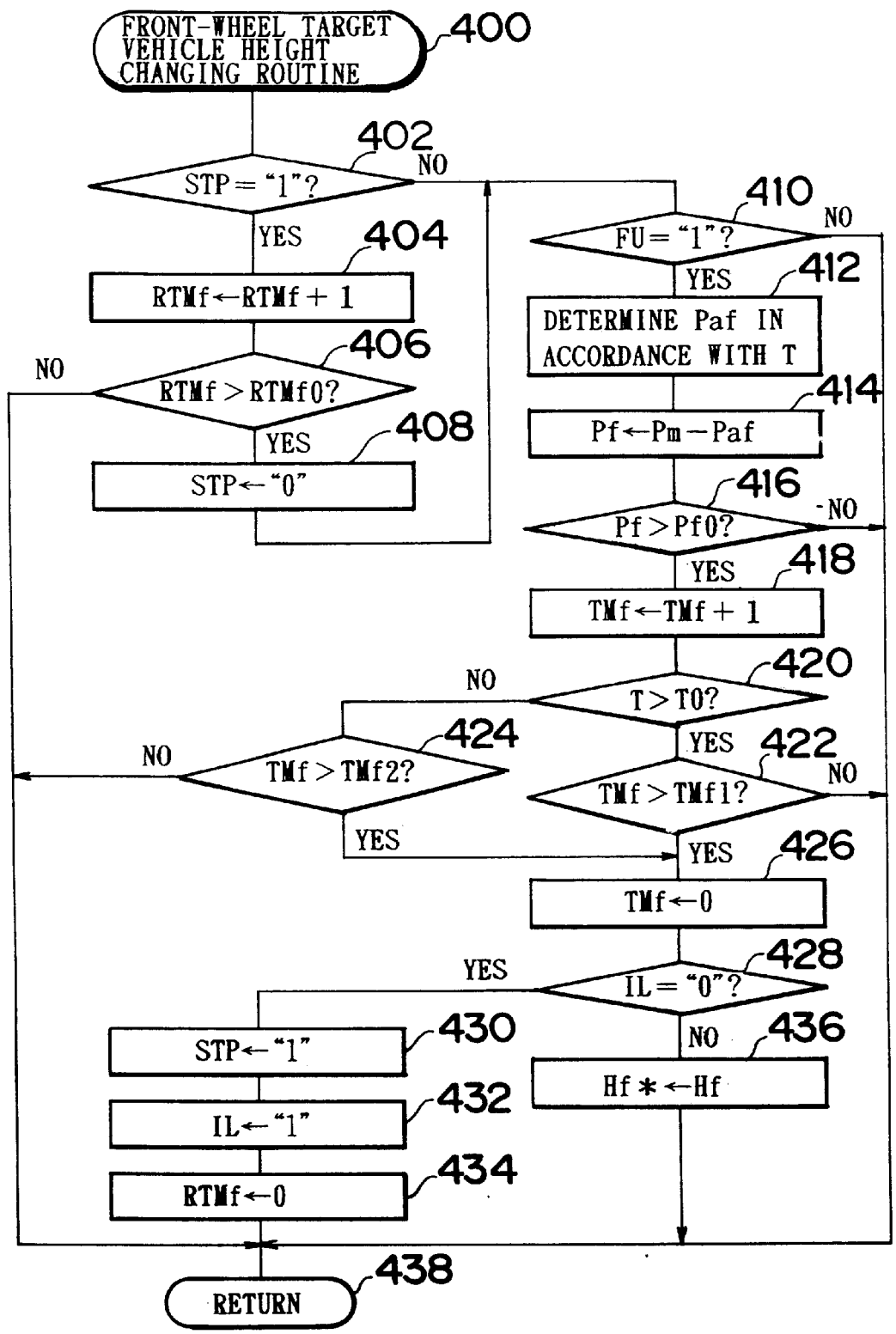
FIG. 5 is a flowchart illustrating in detail the front-wheel target vehicle height changing routine indicated in FIG. 2.

The front-wheel target vehicle height changing routine is illustrated in detail in FIG. 5. When the routine is started in step 400, the microcomputer 30 determines in step 402 whether the suspension flag STP is "1". The suspension flag STP is initially set to "0", and then set to "1" by the processing of step 430 described below, to indicate a suspension of the vehicle height adjustment. In the present case, the suspension flag STP is "0", so that the microcomputer 30 makes a negative determination (NO) in step 402, and proceeds to step 410. In step 410, it is determined whether the front raising flag FU is "1", that is, whether the raising control of the front portion of the vehicle body 10 is being performed. If the raising control of the front portion of the vehicle body 10 is not being performed, the microcomputer 30 makes a negative determination (NO) in step 410, and ends the execution of the front-wheel target vehicle height changing routine in step 438. Conversely, if the raising control of the front portion of the vehicle body 10 is being performed, the microcomputer 30 makes an affirmative determination (YES) in step 410, and proceeds to step 412.

Figure 9:
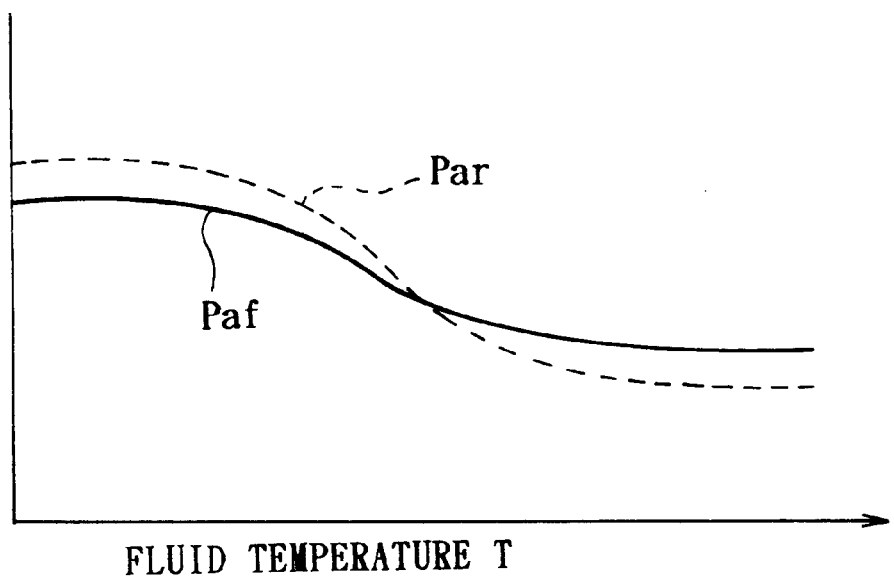
FIG. 9 is a graph indicating the relationship between fluid temperature and pressure loss.

In step 412, the microcomputer 30 determines a pressure loss Paf in a passage from the hydraulic pump 22 to the hydraulic cylinders 11a, 11b for the left and right front wheels W1, W2, that is, a pressure reduction of hydraulic fluid in a passage from the hydraulic pump 22 to the hydraulic cylinders 11a, 11b, on the basis of the fluid temperature T inputted in step 102 in the main program. In the processing of step 412, the microcomputer 30 derives a pressure loss Paf corresponding to the inputted fluid temperature T by referring to a fluid temperature-pressure loss table (see the solid line curve in FIG. 9) in which the pressure loss Paf varies in accordance with the fluid temperature T. The fluid temperature-pressure loss table is provided in the microcomputer 30. For simplification of program design, it is also possible to handle the pressure loss Paf (also, the pressure loss Par for the side of the left and right rear wheels W3, W4) as a constant value that does not change with the fluid temperature T.

Subsequently in step 414, the microcomputer 30 calculates a fluid pressure Pf(=Pm−Paf) in the hydraulic cylinders 11a, 11b (hereinafter, referred to as "cylinder pressure") by subtracting the pressure loss Paf from the inputted fluid pressure Pm that indicates the ejecting pressure of the hydraulic pump 22. In step 416, it is determined whether the calculated fluid pressure Pf is greater than a predetermined fluid pressure Pf0. The predetermined fluid pressure Pf0 is pre-set to a pressure value at which an excessive load will be imposed on the hydraulic system including the hydraulic pump 22. If the cylinder pressure Pf is equal to or less than the predetermined fluid pressure Pf0, the microcomputer 30 makes a negative determination (NO) in step 416, and ends the execution of the front-wheel target vehicle height changing routine in step 438.

Conversely, if the cylinder pressure Pf is greater than the predetermined fluid pressure Pf0, the microcomputer 30 makes an affirmative determination (YES) in step 416, and adds 1 to a timer count TMf in step 418, and proceeds to step 420. In step 420, it is determined whether the inputted fluid temperature T is greater than a predetermined fluid temperature T0. If the inputted fluid temperature T is greater than the predetermined fluid temperature T0, the microcomputer 30 makes an affirmative determination (YES) in step 420, and then determines in step 422 whether the timer count TMf is greater than a predetermined value TMf1. Conversely, if the inputted fluid temperature T is equal to or lower than the predetermined value TMf1, the microcomputer 30 makes a negative determination (NO) in step 420, and then determines in step 424 whether the timer count TMf is greater than a predetermined value TMf2. The predetermined value TMf1 is pre-set to a value smaller than the predetermined value TMf2. For example, the predetermined value TMf1 is set to a value corresponding to 1 second, and the predetermined value TMf2 is set to a value corresponding to 3 seconds. Since the timer count TMf is initially set to 0, the determination in step 422 or 424 is negative for a period immediately after the cylinder pressure Pf has exceeded the predetermined fluid pressure Pf0. Then in step 438, the microcomputer 30 ends the execution of the front-wheel target vehicle height changing routine.

If the cylinder pressure Pf continues to be greater than the predetermined fluid pressure Pf0 so that the timer count TMf incremented in step 418 exceeds the predetermined value TMf1 (or the predetermined value TMf2), the microcomputer 30 makes an affirmative determination (YES) in step 422 (or step 424), and clears the timer count TMf to 0 in step 426. Subsequently in step 428, it is determined whether an initial flag IL is "0". Since the initial flag IL is initially set to "0", the microcomputer 30 makes an affirmative determination (YES) in step 428, and then sets the suspension flag STP to "1" in step 430, and changes the initial flag IL to "1" in step 432, and initializes a repeat timer count RTMf to 0 in step 434, and ends the execution of the front-wheel target vehicle height changing routine in step 438.

When the vehicle height changing routine illustrated in FIG. 4 is executed in the conditions as described above, the microcomputer 30 makes an affirmative determination (YES) in step 302, and proceeds to a change suspension control processing of step 318. In the change suspension control processing, all of the front raising flag FU, the front lowering flag FD, the rear raising flag RU and the rear lowering flag RD, which are used for raising and lowering the front and rear portions of the vehicle body 10 in the drive control program of FIG. 8, are set back to "0". Therefore, the next time the drive control program of FIG. 8 is executed, all the operations for the raising control of the front and rear portions of the vehicle body 10 are suspended even if the raising control of the front or rear portion of the vehicle body 10 is being performed. The suspension of the raising control means the stop of the operation of the electric motor 21 and the hydraulic pump 22. After step 318, the microcomputer 30 sets, in step 320, "0" in the changing flag CF where "1" was set during the vehicle height increasing control. In addition, the change start flag CS is changed to "1" in step 320.

When the front-wheel target vehicle height changing routine of FIG. 5 is executed with the suspension flag STP being "1", the microcomputer 30 makes an affirmative determination (YES) in step 402, and proceeds to step 404, 406. In step 404, the microcomputer 30 adds 1 to the repeat timer count RTMf which was initialized to zero in step 434. Subsequently, in step 406, it is determined whether the incremented repeat timer count RTMf has exceeded a predetermined value RTMf0 (for example, a value corresponding to a predetermined time of about 2 seconds). If the repeat timer count RTMf is equal to or less than the predetermined value RTMf0, the microcomputer 30 makes a negative determination (NO) in step 406, and ends the front-wheel target vehicle height changing routine in step 438, thereby keeping the suspension flag STP at "1". Thus, the suspension of the raising control of the front portion of the vehicle body 10 is continued for the aforementioned predetermined time (corresponding to the predetermined value RTMf0) after the start of the raising control.

Conversely, when the aforementioned predetermined time has elapsed, that is, when the repeat timer count RTMf exceeds the predetermined value RTMf1, the microcomputer 30 makes an affirmative determination (YES) in step 406, and then sets the suspension flag STP back to "0" in step 408. Therefore, the next time the vehicle height changing routine of FIG. 4 is executed, the microcomputer 30 makes a negative determination (NO) in step 302, so that the processes of step 304 and the following steps are performed. In this case, the changing flag CF is "0" and the change start flag CS is "1" because of the processing in step 320 executed during the suspension. Therefore, the vehicle height adjustment control of steps 304–316, more specifically, the vehicle front portion raising control, is restarted.

After step 408 in the front-wheel target vehicle height changing routine of FIG. 5, the processings of step 410 and the following steps are executed again. The processings of steps 410–426 have been described above. If the program operation proceeds to step 428, the microcomputer 30 makes a negative determination (NO) in step 428 since the initial flag IL has been set to "1" by the processing of step 432. Therefore, the program operation proceeds to step 436. In step 436, the target vehicle height Hf* of the front portion of the vehicle body 10 is set to the present actual vehicle height Hf of the front portion determined in step 104 in the main program. The target vehicle height Hf* is thus changed. Therefore, in the next and later cycles of the start determining routine of FIG. 3, an instruction to start vehicle height adjustment is outputted if the actual vehicle height Hf deviates more than a predetermined amount from the changed target vehicle height Hf*. In response to the instruction, the actual vehicle height Hf of the front portion of the vehicle body 10 is adjusted to the changed target vehicle height Hf* by the vehicle height changing routine of FIG. 4.

Figure 6:
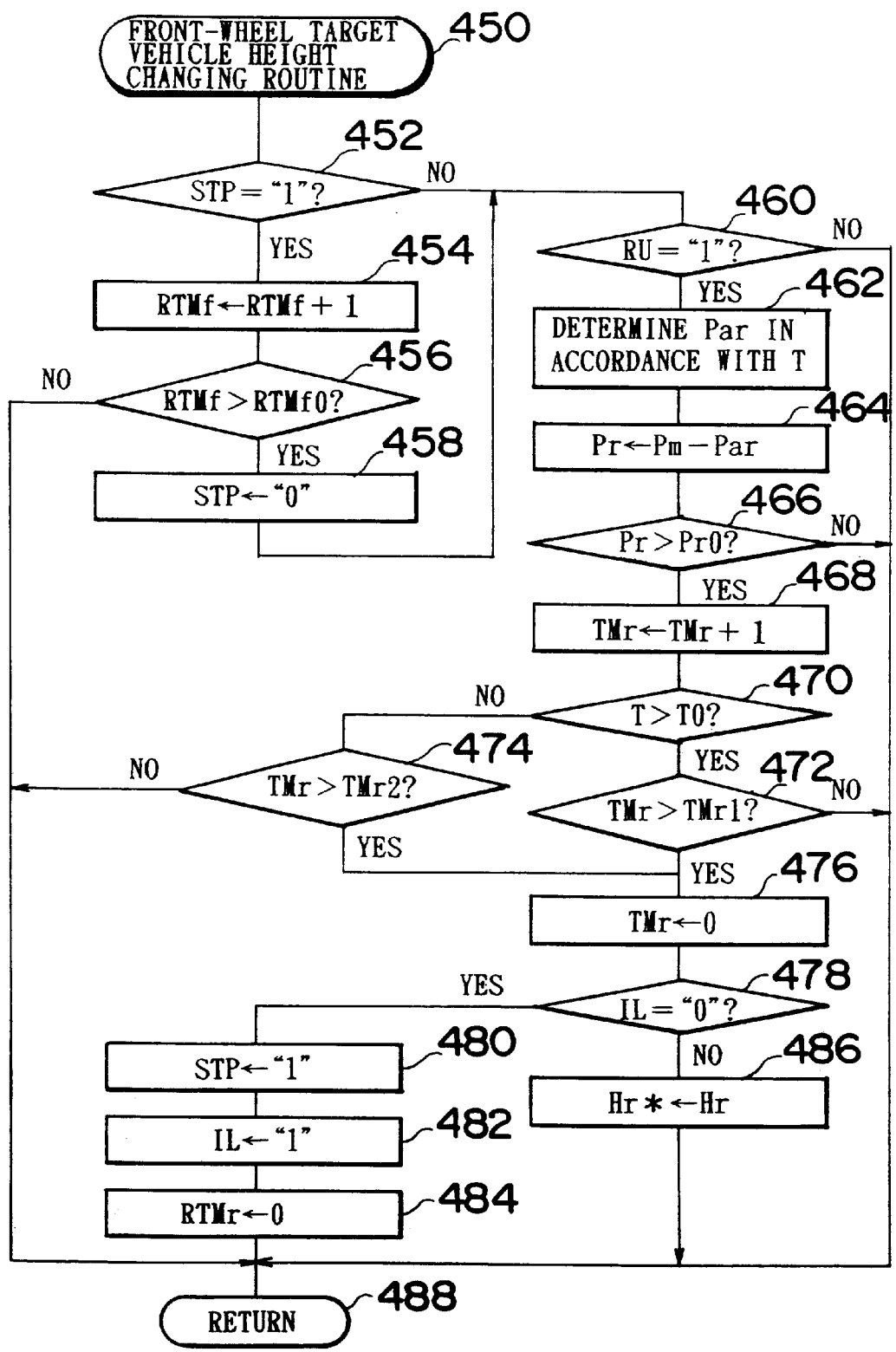
FIG. 6 is a flowchart illustrating in detail the rear-wheel target vehicle height changing routine indicated in FIG. 2.

The rear-wheel target vehicle height changing routine is illustrated in detail in FIG. 6. The routine, having steps 450–488, performs substantially the same processings as in the front-wheel target vehicle height changing routine, with respect to the rear portion of the vehicle body 10. Therefore, the rear-wheel target vehicle height changing routine will not be described in detail. Instead of the various values regarding the front portion of the vehicle body 10 that are used in the front-wheel target vehicle height changing routine, that is, the repeat timer count RTMf, the predetermined value RTMF0 for the count RTMf, the front raising flag FU, the pressure loss Paf of hydraulic fluid in a passage from the hydraulic pump 22 to the hydraulic cylinders 11a, 11b, the fluid pressure Pf in the hydraulic cylinders 11a, 11b, the predetermined fluid pressure Pf0 for the cylinder pressure Pf, the timer count TMf, the predetermined values TMf1, TMf2 for the timer count TMf, and the target vehicle height Hf* and the actual vehicle height Hf of the front portion of the vehicle body 10, the rear-wheel target vehicle height changing routine uses various values regarding the rear portion of the vehicle body 10, that is, the repeat timer count RTMr, the predetermined value RTMr0 for the count RTMr, the front raising flag RU, the pressure loss Par of hydraulic fluid in a passage from the hydraulic pump 22 to the hydraulic cylinders 11c, 11d, the fluid pressure Pr in the hydraulic cylinders 11c, 11d, the predetermined fluid pressure Pr0 for the cylinder pressure Pr, the timer count TMr, the predetermined values TMr1, TMr2 for the timer count TMr, and the target vehicle height Hr* and the actual vehicle height Hr of the front portion of the vehicle body 10. In the rear-wheel target vehicle height changing routine, the predetermined value RTMr0 is pre-set to a value corresponding to a time of about 2 seconds. The pressure loss Par of hydraulic fluid in the passage from the hydraulic pump 22 to the hydraulic cylinders 11c, 11d is determined corresponding to the fluid temperature T on the basis of the characteristic indicated by the broken line curve in the graph of FIG. 9. The predetermined fluid pressure Pr0 is set to a pressure value at which an excessive load will be imposed on the hydraulic system including the hydraulic pump 22. The predetermined value TMr1 is set to a value smaller than the predetermined value TMr2; for example, the predetermined value TMr1 is set to a value corresponding to about 1 second, and the predetermined value TMr2 is set to a value corresponding to about 3 seconds.

The functions of the front-wheel target vehicle height changing routine and the rear-wheel target vehicle height changing routine, which are operated as described above, will be described. If the actual vehicle height Hf or Hr of the front or rear portion of the vehicle body 10 cannot be increased to the target vehicle height Hf* or Hr* despite a considerably high fluid pressure Pf or Pr supplied to the hydraulic cylinders 11a, 11b or 11c, 11d because of an excessively large vehicle-superimposed load, the ability of the hydraulic system including the hydraulic pump 22, the hydraulic cylinders 11a–11d and the like, an abnormality in detection of the vehicle heights Hf1, Hf2 or Hr by the vehicle height sensors 32a, 32b or 32c, or other reasons, the processings of steps 412–416, 436 in the front-wheel target vehicle height changing routine or the processings of steps 462–466, 486 in the rear-wheel target vehicle height changing routine change the target vehicle height Hf* or Hr* to the present actual vehicle height Hf, Hr of the front or rear portion of the vehicle body 10 on condition that the cylinder pressure Pf or Pr has exceeded the predetermined fluid pressure Pf0 or Pr0. Therefore, by the next execution of the start determining routine, the vehicle height changing routine and the drive control program, the actual vehicle height Hf or Hr of the front or rear portion of the vehicle body 10 can be adjusted to the target vehicle height Hf* or Hr*. In this manner, this embodiment prevents a situation where the hydraulic pressure in the hydraulic system, including the hydraulic pump 22, the hydraulic cylinders 11a–11d and the like, becomes very high, and a situation where the electric motor 21 and the hydraulic pump 22 continue operating for a long time. Consequently, the durability or service life of various components of the hydraulic system, including the electric motor 21, the hydraulic pump 22, the hydraulic cylinders 11a–11d and the like, are increased.

Furthermore, if the cylinder pressure Pf or Pr exceeds the predetermined fluid pressure Pf0 or Pr0 for the first time, the processings of steps 402–408, 428–436 or the processings of steps 452–458, 478–486 suspend the operation of the electric motor 21 and the hydraulic pump 22 to suspend the supply and discharge of hydraulic fluid with respect to the hydraulic cylinders 11a–11d. After that, if the cylinder pressure Pf or Pr exceeds the predetermined fluid pressure Pf0 or Pr0 again while the electric motor 21 and the hydraulic pump 22 are operating to supply hydraulic fluid to the hydraulic cylinders 11a–11d, then the target vehicle height Hf* or Hr* is changed. Therefore, if the actual vehicle height Hf or Hr cannot be increased to the target vehicle height Hf* or Hr* because of a low fluid temperature T at the time of start of the engine, the raising operation is suspended. Then, by the vehicle height adjustment restarted after the suspension, the actual vehicle height Hf or Hr can be increased to the target vehicle height Hf* or Hr*. In this manner, this embodiment avoids unnecessarily frequent or ineffective changes of the target vehicle heights Hf*, Hr*.

In the routines for changing the target vehicle height Hf* or Hr*, the processings of steps 418–426 and the processings of steps 468–476 change the target vehicle heights Hf*, Hr* to the present actual vehicle heights Hf, Hr, respectively, if the target vehicle height is changed by the target vehicle height changing device, or if the cylinder pressure Pf, Pr continues to be higher than the predetermined fluid pressure Pf0, Pr0 for a predetermined length of time. Therefore, an unnecessary change of the target vehicle height Hf* or Hr* can be avoided even in a case of false detection of a cylinder pressure Pf or Pr wherein, for example, the cylinder pressure Pf or Pr instantaneously becomes very high, due to an abnormality in the pressure sensor 35 or the temperature sensor 36, noise contamination of the detection signal from these sensors, or the like.

By the processes of steps 420–422 and the processes of steps 470–472, the timer counts TMf, TMr, which are used to measure the aforementioned predetermined time, are compared with the predetermined values TMf1, TMr1, respectively, if the fluid temperature T is higher than the predetermined fluid temperature T0, and the timer counts TMf, TMr are compared with the predetermined values TMf2, TMr2, respectively, if the fluid temperature T is equal to or lower than the predetermined fluid temperature T0. The magnitude relationship between the predetermined values TMf1 and TMf2 and between the predetermined values TMr1 and TMr2 are set as follows: TMf1<TMf2, and TMr1<TMr2. Therefore, before the target vehicle height Hf* or Hr* is changed, the cylinder pressure Pf or Pr needs to remain above the predetermined fluid pressure Pf0 or Pr0 for a longer time in the case of a relatively low fluid temperature T than in the case of a relatively high fluid temperature T. Consequently, this embodiment avoids performing ineffective or unnecessarily frequent changes of the target vehicle heights Hf*, Hr* even when the fluid temperature T is relatively low.

In the front-wheel target vehicle height changing routine and the rear-wheel target vehicle height changing routine, it is also possible to omit steps 402–408, 428–434 and steps 452–458, 478–484, that is, the vehicle height adjustment suspension control. It is also possible to include an operation of counting the number of suspensions during the execution of steps 428–434 and steps 478–484 and an operation of determining whether the count has reached a predetermined value, so that after the suspension has been performed a predetermined number of times, the operation of changing the target vehicle height Hf* or Hr* in step 436 or 486 is performed.

It is also possible to omit steps 420, 424 and steps 470, 474 so that regardless of the fluid temperature T, the process of step 426 and the following steps and the process of step 476 and the following steps are executed to change the target vehicle heights Hf*, Hr*, on condition that the timer counts TMf, TMr have exceeded the predetermined values TMf1, TMr1, respectively. Furthermore, it is also possible to omit steps 420, 424 and steps 470, 474 and add between steps 418 and 422 and between steps 468 and 472 an operation using a device, such as a table, for determining predetermined values TMf1, TMr1 that continuously decrease with increases of the fluid temperature T, whereby the target vehicle heights Hf*, Hr* are changed when the cylinder pressures Pf, Pr continue to be greater than the predetermined fluid pressures Pf0, Pr0, respectively, for a length of time that is continuously increased with decreases of the fluid temperature T.

It is also possible to omit steps 418–426 and steps 468–476, that is, omit the operation of determining whether the timer counts TMf, TMr have exceeded the predetermined values TMf1, TMr1 or the predetermined values TMf2, TMr2, respectively, whereby the changing of the target vehicle heights Hf*, Hr* and the vehicle height adjustment suspension control will be performed only on the condition that fluid pressures Pf, Pr have exceeded the predetermined fluid pressures Pf0, Pr0.

Figure 7:
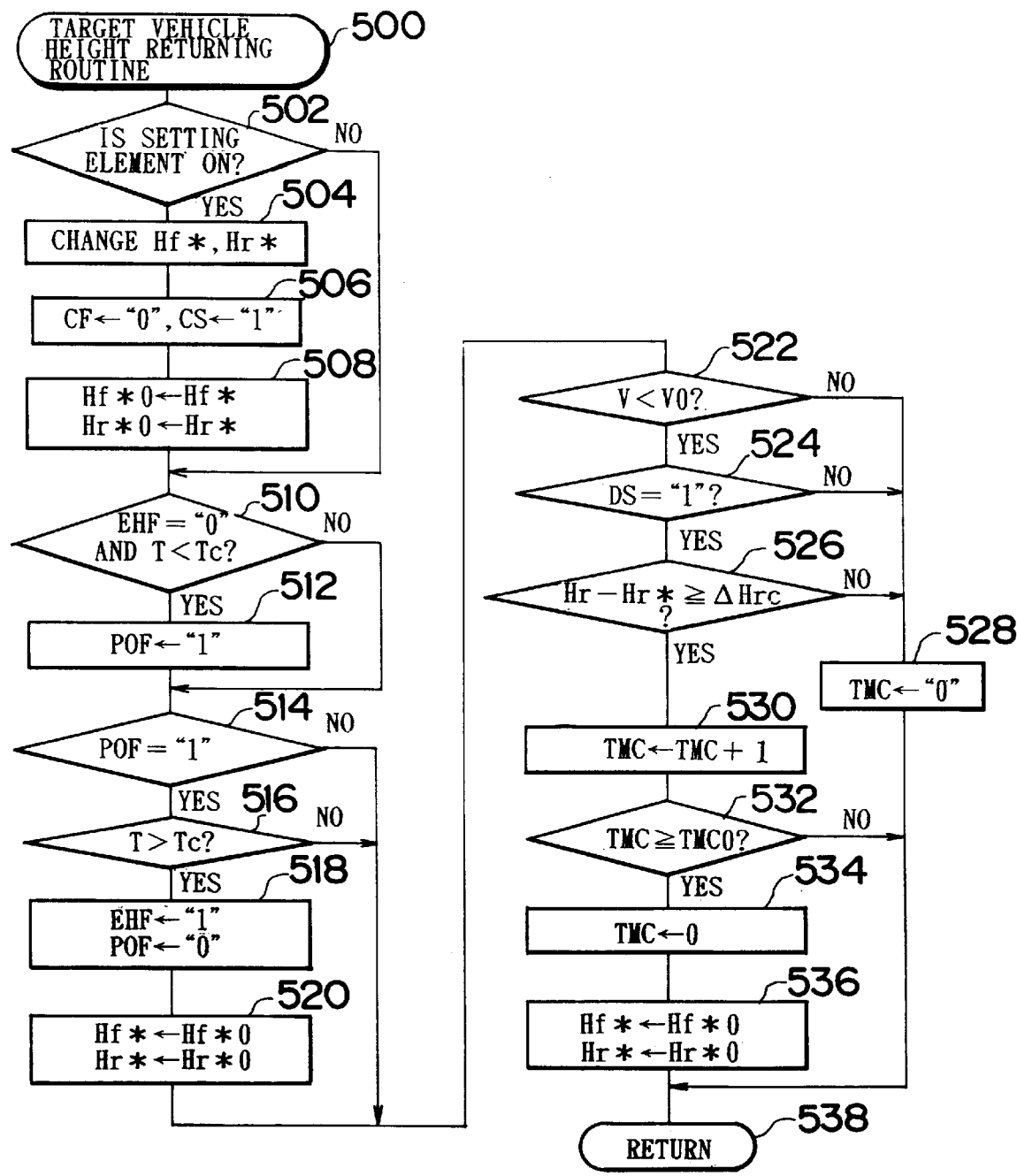
FIG. 7 is a flowchart illustrating in detail the target vehicle height returning routine indicated in FIG. 2.

Next described will be the target vehicle height returning routine of step 114. In this routine, the target vehicle heights Hf*, Hr* changed as described above are re-set in accordance with an operation performed using the target vehicle height changing switch 31, or the changed target vehicle heights Hf*, Hr* are returned to the previous values before the change, on predetermined conditions. The target vehicle height returning routine, illustrated in detail in FIG. 7, is started in step 500.

In the process of steps 502–508, the target vehicle heights Hf*, Hr* are set to values corresponding to a turning-on operation of the up-setting element 31a or the down-setting element 31b of the target vehicle height changing switch 31, if either one of them is turned on, regardless of the changing of the target vehicle heights Hf*, Hr*, as described above.

More specifically, it is determined in step 502 whether the up-setting element 31a or the down-setting element 31b of the target vehicle height changing switch 31 is turned on. If neither of the setting elements 31a, 31b is turned on, the microcomputer 30 makes a negative determination (NO) in step 502, and proceeds to step 510. In this case, the target vehicle heights Hf*, Hr* of the front and rear portions of the vehicle body 10 are maintained at the values that were previously set or changed and have been stored in the non-volatile memory.

Conversely, if either one of the setting elements 31a, 31b is turned on, the microcomputer 30 makes an affirmative determination (YES) in step 502, and changes the target vehicle heights Hf*, Hr* in step 504. If the up-setting element 31a is turned on, the target vehicle heights Hf*, Hr* are incremented to an upper-level value for every turning-on operation as long as each of the present target vehicle heights Hf*, Hr* is below a pre-set maximum value. If the down-setting element 31b is turned on, the target vehicle heights Hf*, Hr* are decremented to a lower-level value for every turning-on operation as long as each of the present target vehicle heights Hf*, Hr* is above a pre-set minimum value. After step 504, the microcomputer 30 sets the changing flag CF to "0" and the change start flag CS to "1" in step 506. Due to the settings of the flags CF, CS, the raising or lowering control of the front and rear portions of the vehicle body 10 is performed by the process of steps 304–316 in the next cycle of the vehicle height changing routine of FIG. 4, so that the actual vehicle heights Hf, Hr are adjusted to the target vehicle heights Hf*, Hr* set in step 506.

Therefore, by operating the target vehicle height changing switch 31, the target vehicle heights Hf*, Hr* can be set in accordance with the operation of the target vehicle height changing switch 31, even if the target vehicle heights Hf*, Hr* have been changed by the target vehicle height changing routines as described above. Consequently, the actual vehicle heights Hf, Hr of the vehicle can be set to a vehicle height that reflects a desire of an occupant.

After step 506, the microcomputer 30 changes the old target vehicle heights Hf*0, Hr*0 to the presently-set target vehicle heights Hf*, Hr*, and updates the data regarding the target vehicle heights Hf*, Hr* in the non-volatile memory in step 508. The processing of step 508 is provided to store the previous target vehicle heights Hf*, Hr* as the old target vehicle heights Hf*0, Hr*0 so that the target vehicle heights Hf*, Hr* changed by the front-wheel target vehicle height changing routine or the rear-wheel target vehicle height changing routine can be returned to the previous values before the change.

In the process of steps 510–520, the change of the target vehicle heights Hf*, Hr*, if caused by a previous low fluid temperature T, is canceled when the fluid temperature T increases to a certain level. More specifically, in step 510, it is determined whether a cancel history flag EHF is "0" and the fluid temperature T is lower than a predetermined fluid temperature Tc (pre-set to a low temperature that impedes the raising of the front and rear portions of the vehicle body 10). The cancel history flag EHF indicates by "1" that the change of the target vehicle heights Hf*, Hr* has been canceled once by this canceling operation. The cancel history flag EHF is set to "0" by the initial setting described above immediately after the ignition switch is turned on. Therefore, in the execution of step 510 immediately after the ignition switch is turned on, the determination becomes affirmative merely if the fluid temperature T is lower than the predetermined fluid temperature Tc. Subsequently in step 512, a pressure restriction flag POF is set to "1". The pressure restriction flag POF indicates by "1" that there is a possibility that because of a low fluid temperature T, the front and rear portions of the vehicle body 10 could not be raised to the target vehicle heights Hf*, Hr*. Conversely, if the fluid temperature T is equal to or higher than the predetermined fluid temperature Tc immediately after the ignition switch is turned on, the determination in step 510 becomes negative. In this case, the pressure restriction flag POF will not be set to "1" but maintained at "0", since the fluid temperature T normally rises after the ignition switch is turned on.

After steps 510, 512, the microcomputer 30 determines in step 514 whether the pressure restriction flag POF is "1". If the pressure restriction flag POF has been maintained at "0", the microcomputer 30 makes a negative determination (NO) in step 514, and jumps to step 522 without executing steps 516–520. Conversely, if the pressure restriction flag POF has been set to "1" due to a low fluid temperature T immediately after the turning-on of the ignition switch, the microcomputer 30 makes an affirmative determination (YES) in step 514, and then determines in step 516 whether the fluid temperature T is equal to or higher than the predetermined fluid temperature Tc. While the fluid temperature T is below the predetermined fluid temperature Tc, the microcomputer 30 repeatedly makes a negative determination (NO) in step 516, and proceeds to step 522. When the fluid temperature T increases to the predetermined fluid temperature Tc, the microcomputer 30 makes an affirmative determination (YES) in step 516, and then proceeds to steps 518, 520. In step 518, the microcomputer 30 sets the cancel history flag EHF to "1" and sets the pressure restriction flag POF back to "0". In step 520, the target vehicle heights Hf*, Hr* are set back to the old target vehicle heights Hf*0, Hr*0, respectively.

Therefore, if the target vehicle height Hf* or Hr* has been changed by the front-wheel target vehicle height changing routine or the rear-wheel target vehicle height changing routine because the fluid temperature T was lower than the predetermined fluid temperature Tc immediately after the turning-on of the ignition switch, the changed target vehicle height Hf* or Hr* is set back to the previous target vehicle height Hf* or Hr* before the change, when the fluid temperature T has increased to the predetermined fluid temperature Tc. Consequently, if the actual vehicle heights Hf, Hr of the front and rear portions of the vehicle body 10 cannot be adjusted to the target vehicle heights Hf*, Hr* because of a low fluid temperature T at the time of, for example, the starting of the engine, the target vehicle heights Hf*, Hr* are changed at the time of starting of the engine so as to avoid imposing excessive loads on the hydraulic system including the electric motor 21, the hydraulic pump 22, the hydraulic cylinders 11a–11d and the like. Subsequently, when the fluid temperature T has increased sufficiently, it becomes possible to adjust the actual vehicle heights Hf, Hr of the front and rear portions of the vehicle body 10 to the target vehicle heights intended by an occupant. In the operation described above, the number of times of cancellation of the fluid pressure restriction, that is, the return of the target vehicle heights Hf*, Hr* to the previous values, is limited to one by using the cancel history flag EHF, for the purpose of avoiding repeatedly performing cancellation of the fluid pressure restriction if the front and rear portions of the vehicle body 10 cannot be raised due to an abnormality in the temperature sensor 36 or the like.

The process of steps 522–536 is a process wherein after change of the target vehicle heights Hf*, Hr* due to an excessive load superimposed on the vehicle, the target vehicle heights Hf*, Hr* are returned to the previous target vehicle heights Hf*, Hr* if the vehicle-superimposed load is later reduced. More specifically, in step 522, it is determined whether the vehicle speed V is less than a predetermined vehicle speed V0. In step 524, it is determined whether the door switch signal DS is "1". In step 526, it is determined whether the vehicle height deviation Hr–Hr* of the actual vehicle height Hr from the target vehicle height Hr* of the rear portion of the vehicle body 10 is equal to or greater than a predetermined value ΔHrc. The processing of step 522 determines whether the vehicle is in a substantially stopped state. The predetermined vehicle speed V0 is pre-set to a very low speed of about 5 km/h. Instead of the determination regarding the vehicle speed V, it is also possible to determine whether the vehicle is in a stopped state by, for example, determining whether the transmission is in a parking position. The processing of step 524 determines whether any one of the doors, including the trunk lid, is open and, therefore, whether there has been a possibility of a reduction in the number of occupants or in the baggage weight. The processing of step 526 determines whether there is at least a certain rise of the rear portion of the vehicle body 10 caused by a reduction of the load superimposed on the vehicle. The predetermined value ΔHrc is pre-set to a relatively small value.

If the vehicle speed V is not less than the predetermined vehicle speed V0, or if the door switch signal DS is not "1", or if the vehicle height deviation Hr–Hr* is less than the predetermined ΔHrc, the microcomputer 30 makes a negative determination (NO) in step 522, 524 or 526, and then clears a timer count TMC to 0 in step 528, and ends the execution of the target vehicle height returning routine in step 538. Conversely, if the vehicle speed V is less than the predetermined vehicle speed V0 and the door switch signal DS is "1" and the vehicle height deviation Hr–Hr* is equal to or greater than the predetermined value ΔHcr, the microcomputer 30 makes an affirmative determination (YES) in each of steps 522–526, and then adds "1" to the count value TMC in step 530, and proceeds to step 532. In step 532, it is determined whether the timer count TMC is equal to or greater than a predetermined value TMC0. As long as the timer count TMC is less than the predetermined value TMC0, the microcomputer 30 makes a negative determination (NO) in step 532, and ends the target vehicle height returning routine in step 538.

When the timer count TMC becomes equal to or greater than the predetermined value TMC0, the microcomputer 30 makes an affirmative determination (YES) in step 532, and proceeds to steps 534, 536. In step 534, the timer count TMC is cleared to 0. In step 536, the target vehicle heights Hf*, Hr* are changed to the old target vehicle heights Hf*0, Hr*0, respectively.

Therefore, if the target vehicle height Hf* or Hr* has been changed by the front-wheel target vehicle height changing routine or the rear-wheel target vehicle height changing routine due to an excessive load superimposed on the vehicle, the changed target vehicle heights Hf*, Hr* are returned to the previous target vehicle heights Hf*, Hr* before the change through the processes of steps 522–526, 536, on conditions that the vehicle has been stopped, and that any one of the doors, including the trunk lid, is open, and that, presumably due to a reduction in the number of occupants, a reduction in the baggage weight, or the like, the rear portion of the vehicle body 10 has risen above the changed target vehicle height Hr*. Consequently, after an excessive load on the hydraulic system, including the electric motor 21, the hydraulic pump 22 and the hydraulic cylinders 11a–11d, is avoided when the load superimposed on the vehicle is excessively large, it becomes possible to adjust the actual vehicle heights Hf, Hr of the front and rear portions of the vehicle body 10 to target vehicle heights intended by an occupant, if the vehicle-superimposed load is reduced. Through the processings of steps 528–534, the target vehicle heights Hf*, Hr* are not returned to the previous target vehicle heights Hf*, Hr* unless a reduction in the number of occupants or the baggage weight is continually determined for a time corresponding to the predetermined value TMC0. Therefore, if there is an instantaneous false detection by the vehicle speed sensor 33, the door switch 34 or the vehicle height sensor 32c due to noise contamination, immediate return of the target vehicle heights Hf*, Hr* to the previous target heights does not occur. In this manner, this operation prevents unnecessary or inappropriate return of the target vehicle heights Hf*, Hr* and therefore prevents unnecessary operation of the electric motor 21 and the hydraulic pump 22.

In the target vehicle height returning routine, the target vehicle heights Hf*, Hr* are returned to the previous target vehicle heights only when the conditions that the vehicle speed V is less than the predetermined vehicle speed V0, and that the door switch signal DS is "1", and that the vehicle height deviation Hr–Hr* is equal to or greater than the predetermined value ΔHrc, are met continuously for at least the predetermined length of time. However, at least one of these conditions may be omitted in accordance with limitations regarding programs. For example, the time condition may be omitted, that is, steps 528–534 may be omitted. In addition, normally, a door is opened during a stop of the vehicle, and a reduction in the number of occupants or the baggage weight occurs also during a stop of the vehicle. Therefore, it is possible to omit either one of the determining processes of steps 522, 524. Furthermore, although the determining processing of step 256 uses an increase of the actual vehicle height Hr of the rear portion of the vehicle body 10 as a determination condition, it is also possible to use an increase of the actual vehicle height Hf of the front portion of the vehicle body 10 as a determination condition, instead of, or in addition to, the increase of the rear-portion vehicle height Hr. That is, in step 526, it is also possible to determine whether the vehicle height deviation Hf−Hf* of the actual vehicle height Hf from the target vehicle height Hf* of the front portion of the vehicle body 10 is equal to or greater than a predetermined value ΔHfc.

Although in the foregoing embodiment, the target vehicle heights Hf*, Hr* are increased or decreased by one level at a time when the target vehicle height changing switch 31 is operated by an occupant, it is also possible to provide a plurality of setting elements corresponding to high, intermediate and low levels so that when any one of the setting elements is operated, the target vehicle heights Hf*, Hr* are set to the level corresponding to the setting element operated.

Although in the foregoing embodiment, two vehicle height sensors are provided in the front portion of the vehicle body 10 and one vehicle height sensor is provided in the rear portion thereof, it is also possible to provide one vehicle height sensor in each of the front and rear portions of the vehicle body 10 and to detect the actual vehicle heights Hf, Hr of the front and rear portions of the vehicle body 10 using the respective sensors. It is also possible to provide one vehicle height sensor at each of the left and right rear wheels W3, W4, and to detect the vehicle height of the rear portion of the vehicle body 10 by averaging the vehicle heights detected by the two sensors. Furthermore, although the foregoing embodiment performs control such that the actual vehicle heights Hf, Hr of the front and rear portions of the vehicle body 10 are set to the respective target vehicle heights Hf*, Hr*, it is also possible to set the vehicle heights of the vehicle body 10 at the individual wheel positions to their respective target vehicle heights.

Although in the foregoing embodiment, the invention is applied to a hydraulic vehicle height adjust apparatus, the invention may also be applied to vehicle height adjust apparatuses employing other types of fluids, for example, a pneumatic vehicle height adjust apparatus using air. In the application to a pneumatic vehicle height adjust apparatus, the hydraulic pump 22 and the hydraulic cylinders 11a–11d are replaced by a pneumatic pump and pneumatic cylinders, and the various valves 25–28 and the like are also replaced by pneumatic valves and the like.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A vehicle height adjust control apparatus comprising:
   an actuator for changing a height of a vehicle;
   a fluid supply-discharger that supplies fluid to the actuator and discharges the fluid from the actuator;
   a vehicle height detector that detects a vehicle height;
   a vehicle height adjustment controller that controls supply of the fluid to and discharge of the fluid from the actuator by the fluid supply-discharger, on the basis of the vehicle height detected by the vehicle height detector, so that the vehicle height detected by the vehicle height detector becomes substantially equal to a predetermined target vehicle height; and
   a pressure detector that detects a pressure of the fluid supplied to the actuator,
   wherein if it is determined that the pressure detected by the pressure detector is greater than a predetermined pressure, the target vehicle height is changed to a changed target vehicle height equal to the vehicle height detected by the vehicle height detector.

2. A vehicle height adjust control apparatus according to claim 1, further comprising a target vehicle height changing switch that changes the target vehicle height, wherein if an operation of the target vehicle height changing switch is detected, the target vehicle height is set to a value corresponding to the operation of the target vehicle height changing switch.

3. A vehicle height adjust control apparatus according to claim 1, further comprising a temperature detector that detects a temperature of the fluid supplied to the actuator, wherein if it is determined that the temperature detected by the temperature detector has changed from below a first predetermined temperature to above a second predetermined temperature that is higher than the first predetermined temperature, the changed target vehicle height is returned to the predetermined vehicle height.

4. A vehicle height adjust control apparatus according to claim 1, further comprising a door open-closed detector that detects a door-open state and a door-closed state, wherein if the door-open state is detected by the door open-closed detector and it is determined that the vehicle height detected by the vehicle height detector is greater than the changed target vehicle height, the changed target vehicle height is returned to the predetermined target vehicle height.

5. A vehicle height adjust control apparatus according to claim 4, wherein, if the vehicle height detected by the vehicle height detector remains greater than the changed target vehicle height for at least a predetermined length of time, it is determined that the vehicle height detected by the vehicle height detector is greater than the changed target vehicle height.

6. A vehicle height adjust control apparatus according to claim 1, further comprising a stop detector that detects a stopped state of the vehicle, wherein if the stopped state of the vehicle is detected by the stop detector and it is determined that the vehicle height detected by the vehicle height detector is greater than the changed target vehicle height, the changed target vehicle height is returned to the predetermined target vehicle height.

7. A vehicle height adjust control apparatus according to claim 6, wherein, if the vehicle height detected by the vehicle height detector remains greater than the changed target vehicle height for at least a predetermined length of time, it is determined that the vehicle height detected by the vehicle height detector is greater than the changed target vehicle height.

8. A vehicle height adjust control apparatus according to claim 1, wherein, if the pressure detected by the pressure detector remains greater than the predetermined pressure for at least a predetermined length of time, it is determined that the pressure detected by the pressure detector is greater than the predetermined pressure.

9. A vehicle height adjust control apparatus according to claim 8, further comprising a temperature detector that detects a temperature of the fluid supplied to the actuator, wherein the predetermined length of time related to pressure determination is longer when the temperature of the fluid detected by the temperature detector is relatively low than when the temperature of the fluid detected by the temperature detector is relatively high.

10. A vehicle height adjust control apparatus comprising:
   an actuator for changing a height of a vehicle;
   a fluid supply-discharger that supplies fluid to the actuator and discharges the fluid from the actuator;
   a vehicle height detector that detects a vehicle height;

a vehicle height adjustment controller that controls supply of the fluid to and discharge of the fluid from the actuator by the fluid supply-discharger, on the basis of the vehicle height detected by the vehicle height detector, so that the vehicle height detected by the vehicle height detector becomes substantially equal to a predetermined target vehicle height;

a pressure detector that detects a pressure of the fluid supplied to the actuator; and a suspension controller that, if it is determined that the pressure detected by the pressure detector is greater than a predetermined pressure, suspends the supply of the fluid to the actuator for a predetermined length of time and then allows the supply of the fluid to the actuator, wherein if it is determined that the pressure detected by the pressure detector is greater the predetermined pressure while the supply of the fluid to the actuator is allowed after suspension of the supply of the fluid by the suspension controller, the target vehicle height is changed to a changed target vehicle height equal to the vehicle height detected by the vehicle height detector.

11. A vehicle height adjust control apparatus according to claim 10, further comprising a target vehicle height changing switch that changes the target vehicle height, wherein if an operation of the target vehicle height changing switch is detected, the target vehicle height is set to a value corresponding to the operation of the target vehicle height changing switch.

12. A vehicle height adjust control apparatus according to claim 10, further comprising a temperature detector that detects a temperature of the fluid supplied to the actuator, wherein if it is determined that the temperature detected by the temperature detector has changed from below a first predetermined temperature to above a second predetermined temperature that is higher than the first predetermined temperature, the changed target vehicle height is returned to the predetermined vehicle height.

13. A vehicle height adjust control apparatus according to claim 10, further comprising a door open-closed detector that detects a door-open state and a door-closed state, wherein if the door-open state is detected by the door open-closed detector and it is determined that the vehicle height detected by the vehicle height detector is greater than the changed target vehicle height, the changed target vehicle height is returned to the predetermined vehicle height.

14. A vehicle height adjust control apparatus according to claim 13, wherein, if the vehicle height detected by the vehicle height detector remains greater than the changed target vehicle height for at least a predetermined length of time, it is determined that the vehicle height detected by the vehicle height detector is greater than the changed target vehicle height.

15. A vehicle height adjust control apparatus according to claim 10, further comprising a stop detector for detecting a stopped state of the vehicle, wherein if the stopped state of the vehicle is detected by the stop detector and it is determined that the vehicle height detected by the vehicle height detector is greater than the changed target vehicle height, the changed target vehicle height is returned to the predetermined vehicle height.

16. A vehicle height adjust control apparatus according to claim 15, wherein, if the vehicle height detected by the vehicle height detector remains greater than the changed target vehicle height for at least a predetermined length of time, it is determined that the vehicle height detected by the vehicle height detector is greater than the changed target vehicle height.

17. A vehicle height adjust control apparatus according to claim 10, wherein, if the pressure detected by the pressure detector remains greater than the predetermined pressure for at least a predetermined length of time, it is determined that the pressure detected by the pressure detector is greater than the predetermined pressure.

18. A vehicle height adjust control apparatus according to claim 17, further comprising a temperature detector that detects a temperature of the fluid supplied to the actuator, wherein the predetermined length of time related to pressure determination is longer when the temperature of the fluid detected by the temperature detector is relatively low than when the temperature of the fluid detected by the temperature detector is relatively high.

19. A vehicle height adjust control method comprising:

supplying fluid to and discharging fluid from an actuator for changing a height of a vehicle;

detecting a vehicle height;

controlling a supply of a fluid to and discharge of the fluid from an actuator on the basis of the detected vehicle height, so that the detected vehicle height becomes substantially equal to a predetermined target vehicle height;

detecting a pressure of the fluid supplied to the actuator;

determining whether the detected pressure is greater than a predetermined pressure; and changing the target vehicle height, if it is determined that the pressure detected by the pressure detector is greater the predetermined pressure, to a changed target vehicle height equal to the detected vehicle height.

20. The vehicle height adjust control method of claim 19, further comprising:

suspending the supply of the fluid to the actuator for a predetermined length of time, if it is determined that the detected pressure is greater than a predetermined pressure; and allowing the supply of the fluid to the actuator after suspension of the supply of the fluid for the predetermined length of time.

* * * * *